United States Patent [19]

Suzuki

[11] Patent Number: 5,274,562
[45] Date of Patent: Dec. 28, 1993

[54] NUMERICAL CONTROL UNIT FOR FACILITATING TOOL CHANGE

[75] Inventor: Etsuro Suzuki, Aichi, Japan

[73] Assignee: Mitsubishi Denki K.K., Tokyo, Japan

[21] Appl. No.: 757,351

[22] Filed: Sep. 10, 1991

[30] Foreign Application Priority Data

Sep. 10, 1990 [JP] Japan .................................. 2-239414

[51] Int. Cl.⁵ ....................... G06F 15/46; G05B 19/18
[52] U.S. Cl. ........................... 364/474.21; 364/474.2; 483/6; 483/11
[58] Field of Search ........ 364/474.21, 474.2, 191–193; 483/1, 4, 5, 6, 11, 12; 318/568.1

[56] References Cited

U.S. PATENT DOCUMENTS

| | | | |
|---|---|---|---|
| 4,513,366 | 4/1985 | Munekata et al. | 364/474.2 |
| 4,608,645 | 8/1986 | Niwa et al. | 483/4 X |
| 4,752,885 | 6/1988 | Kawakami et al. | 364/474.21 |
| 5,041,985 | 8/1991 | Fujita | 364/474.21 |
| 5,097,587 | 3/1992 | Yasuda | 364/474.21 X |

FOREIGN PATENT DOCUMENTS

4027987 9/1990 Fed. Rep. of Germany.

Primary Examiner—Joseph Ruggiero
Attorney, Agent, or Firm—Sughrue, Mion, Zinn, Macpeak & Seas

[57] ABSTRACT

A "safe" position for a tool changing operation in a numerically controlled machine tool is determined based on specific tool size and machining location. In one embodiment, tool change positions are taught in a teaching operation, and are stored for future reference. During machining, as each tool changing position is encountered, a pointer has advanced to the next such position so that, upon execution of the next tool changing command, the unit moves to the appropriate location. According to other embodiments, the machining program itself is made to store the tool changing positions. This data may be added to the program by an editor on the basis of the information found in the memory, or the data may be added in the initial creation of the program. The data on tool changing positions is then decoded from the machining program when the program is read or executed.

7 Claims, 8 Drawing Sheets

NUMERICAL CONTROL UNIT FOR FACILITATING TOOL CHANGE

BACKGROUND OF THE DISCLOSURE

The present invention relates to a numerical control unit, and in particular to a numerically controlled machine tool which enables more efficient positioning of an interchangeable tool at a tool changing position.

Figure 8:
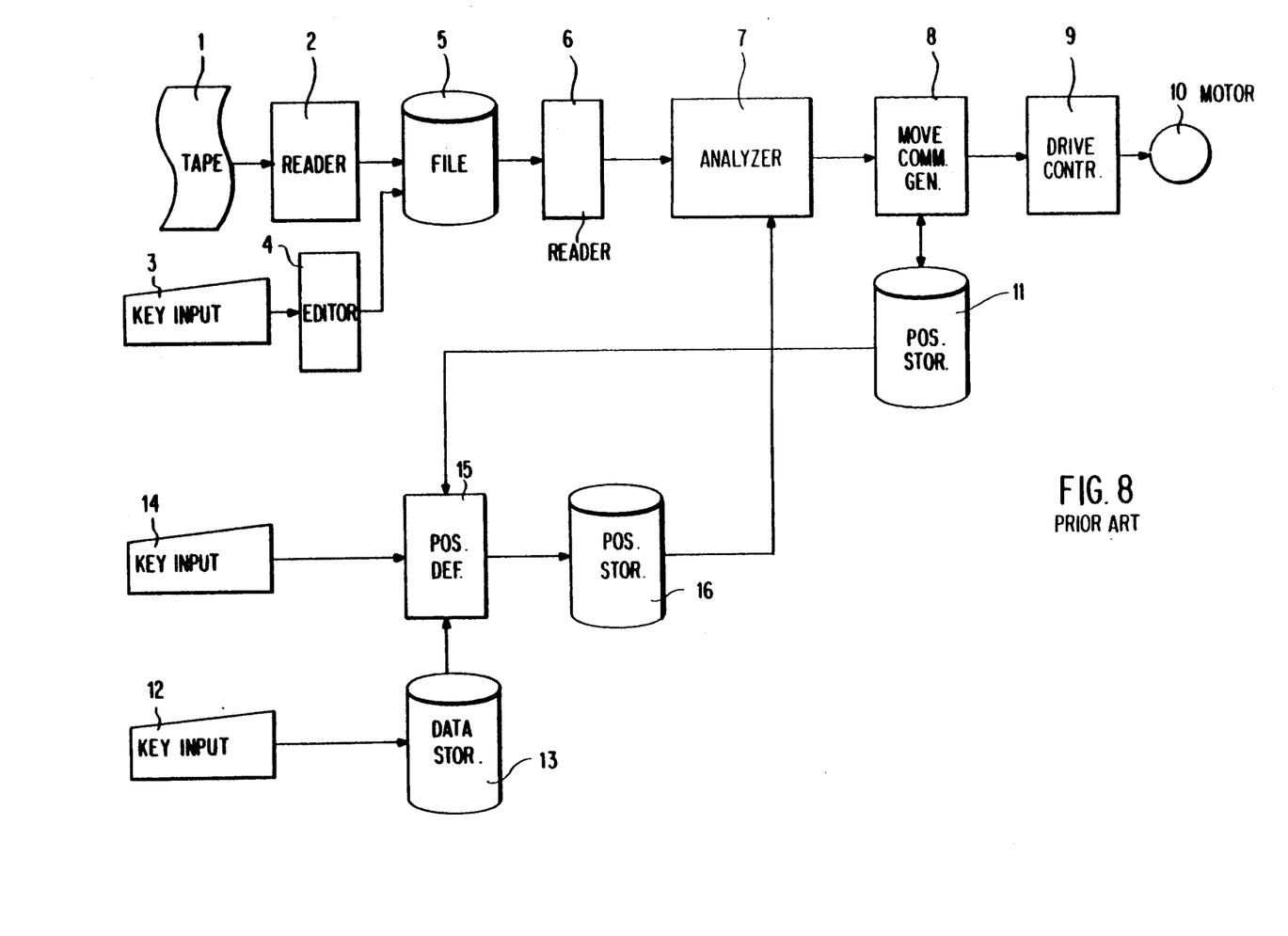
FIG. 8 is a block diagram of a known numerical control unit.

FIG. 8, which is a block diagram of positioning apparatus for achieving a tool changing position in a known numerical control unit, shows a machining program 1, a reader 2 for reading a machining program 1, a key input device 3 for entering a machining program from its keyboard, a machining program editor 4 for writing the machining program in accordance with data entered from the keyboard, a machining program file 5 for storing the machining program written by the machining program reader 2 or the machining program editor 4, a one-block reader 6 for extracting and reading one block from the machining program, a command analyzer 7 for interpreting the command in the block and performing processing such as an operation in accordance with that command, a move command generator 8 for defining the travel of each control axis in accordance with the results of the command analyzer 7, a drive controller 9 for converting a move command into an electrical signal, and a servo motor 10 for driving each control axis. A current position storing device 11 accumulates a current position updated and managed by the move command generating device 8. A key input device 12 enters data such as a tool length. A tool data memory 13 accumulates data such as tool length. A key input device 14 teaches a tool changing position. A tool changing position defining device 15 defines the tool changing position in accordance with the tool data stored in the tool data memory 13 and a teaching command provided by the key input device 14, and a tool changing position memory 16 accumulates the defined tool changing position.

Figure 9:
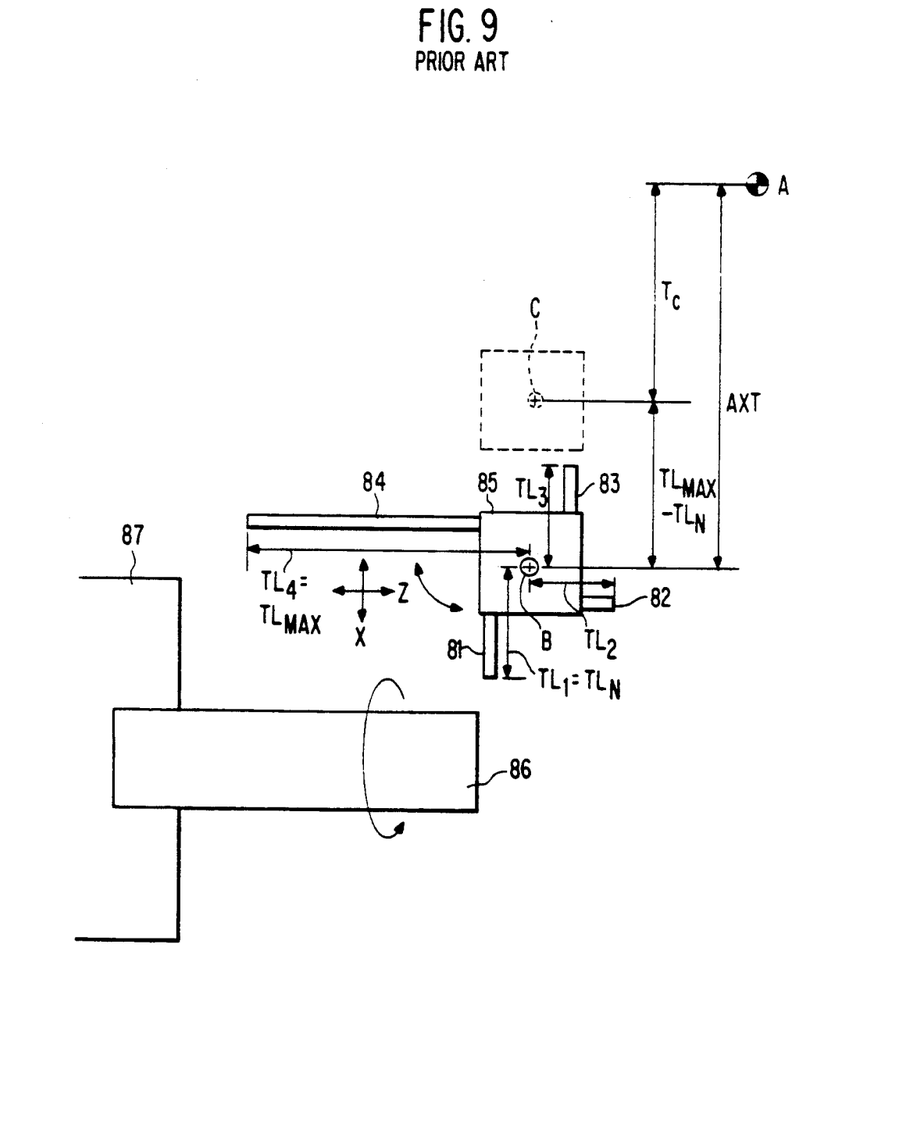
FIG. 9 illustrates a conventional tool changing position storing procedure.

FIG. 9 illustrates relationships among a workpiece, a machine tool and a tool, including a chuck 87 of the machine tool for gripping a workpiece 86, and a tool rest 85 of the machine tool, movable in Z-axis and X-axis directions, and rotatable for making a tool change. First to fourth tools 81-84 are installed in tool rest 85 and are assigned respective tool numbers T00. "A" indicates a reference point, and "B" a current position at the time of teaching, as contained in the current position memory 11 and located a distance $AX_T$ from the reference point A. "C" indicates a tool changing position stored in the tool changing position memory 16 and located a vertical distance TC away from the reference point A.

Operation will now be described with reference to FIGS. 8 and 9. Lengths TL1 to TL4 of the tools 81 to 84 mounted on the tool rest 85 are registered beforehand in the tool data memory 13 from the key input device 12 in correspondence with the tool numbers. After selecting any tool, the tool is positioned manually to a tool changing position where the tool does not interfere with the workpiece 86, the machine chuck 87 and the like, using a jogging function or the like intrinsic to the machine tool. Then, the numerical control unit is taught the tool changing position using the key input device 14. The tool changing position defining device 15 extracts the length $TL_N$ of the tool 81 currently selected, and also the maximum tool length $TL_{MAX}$ among those of the registered tools from the tool data memory 13. The defining device 15 then extracts the teaching-time current position B from the current position storing device 11, obtains the tool changing position C according to the expression $TC = AX_T - (TL_{MAX} - TL_N)$, and stores the result into the tool changing position memory 16.

When automatic operation is to be performed, one program block is fetched by the one-block reader 6 from the machining program stored in the machining program file 5. The command analyzer 7 interprets the one block, extracts the coordinates of the tool changing position C from the tool changing position memory 16 if a tool positioning command (e.g., G24, G25, G26, G27) exists in that one block, or generates the positioning command for the tool changing position C.

The move command generator 8 obtains the amount of travel in accordance with the current position in the current position memory 11 and the target end-point position, i.e., tool changing position C, and gives it to the drive controller 9 as a move command. The drive controller 9 converts the position command into an electrical signal to drive the servo motor 10, and runs the servo motor 10 until the target end-point position, i.e., tool changing position C, is reached, to complete positioning to the tool changing position C.

In the known numerical control unit configured as described above, the tool changing position C is a fixed position defined in accordance with the longest tool 84 and the teaching-time workpiece state. This may cause the tool changing position C to be located further away from the workpiece 86 than required, which results in a disadvantage of longer overall machining time. It is desirable to reduce the machining time by making the tool changing position C variable to provide the optimum tool changing position.

Figure 4:
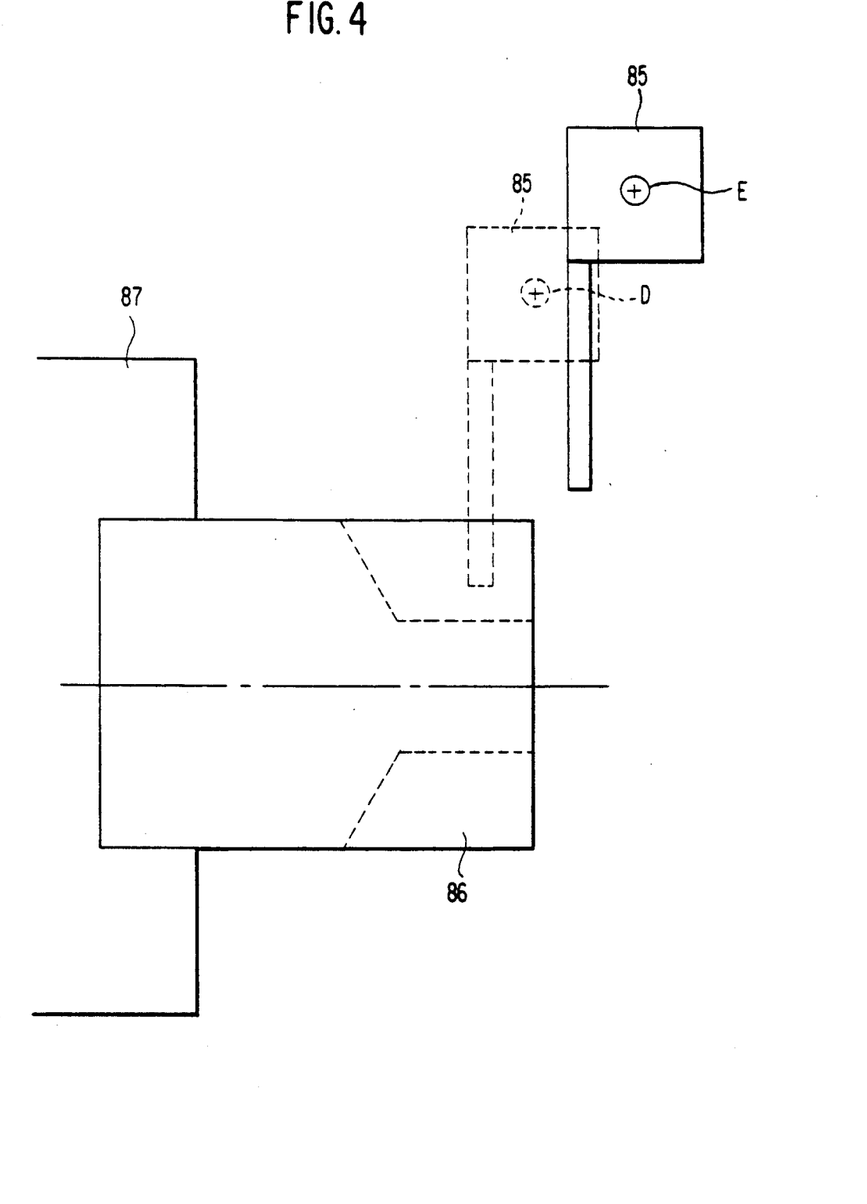
FIG. 4 illustrates how the optimum tool changing position is defined according to a first embodiment of the invention.

FIG. 4 shows machining in which point E indicates a non-interfering tool changing position before machining (the workpiece is indicated by a continuous line), which is defined by the conventional numerical control unit, and point D indicates a non-interfering optimum tool changing position after some machining has been performed (the workpiece is indicated by a broken line). Thus, the tool need not move as far to be in a safe tool changing position. It would be desirable to be able to change the tool at a closer tool changing position, to save time.

SUMMARY OF THE INVENTION

Accordingly, it is an object of the present invention to overcome the disadvantages in the conventional devices by providing a numerical control unit which ensures ease of positioning to the optimum tool changing position every time positioning is performed.

A numerical control unit according to a first embodiment of the invention is equipped with a tool changing position storing mode processor which stops the execution of a machining program when a positioning command for tool changing is given by the machining program during execution of the program in a tool changing position storing (teaching) mode.

A numerical control unit according to a second embodiment of the invention is equipped with a tool changing position memory and a tool changing position editor. The tool changing position editor adds tool changing position data, stored in the tool changing position memory, to a machining program.

A numerical control unit according to a third embodiment of the invention is equipped with a tool changing position memory and a tool changing position storing processor. The tool changing position storing processor stores tool changing position data, in a machining program, at predetermined addresses of the tool changing position memory when a tool changing position setting command is given by the machining program.

The numerical control unit according to the first embodiment of the invention allows the optimum tool changing position to be re-defined by the tool changing position storing mode processor which stops execution of the machining program in a teaching mode.

The numerical control units according to the second and third embodiments prevent the defined tool changing position data from being lost, by means of a tool changing position editor which adds the tool changing position data, stored in the tool changing position memory, into the machining program, and by means of a tool changing position storing processor which takes the tool changing position data from the machining program and enters it in the tool changing position storing device, respectively.

DETAILED DESCRIPTION OF THE PREFERRED EMBODIMENTS

Figure 1:
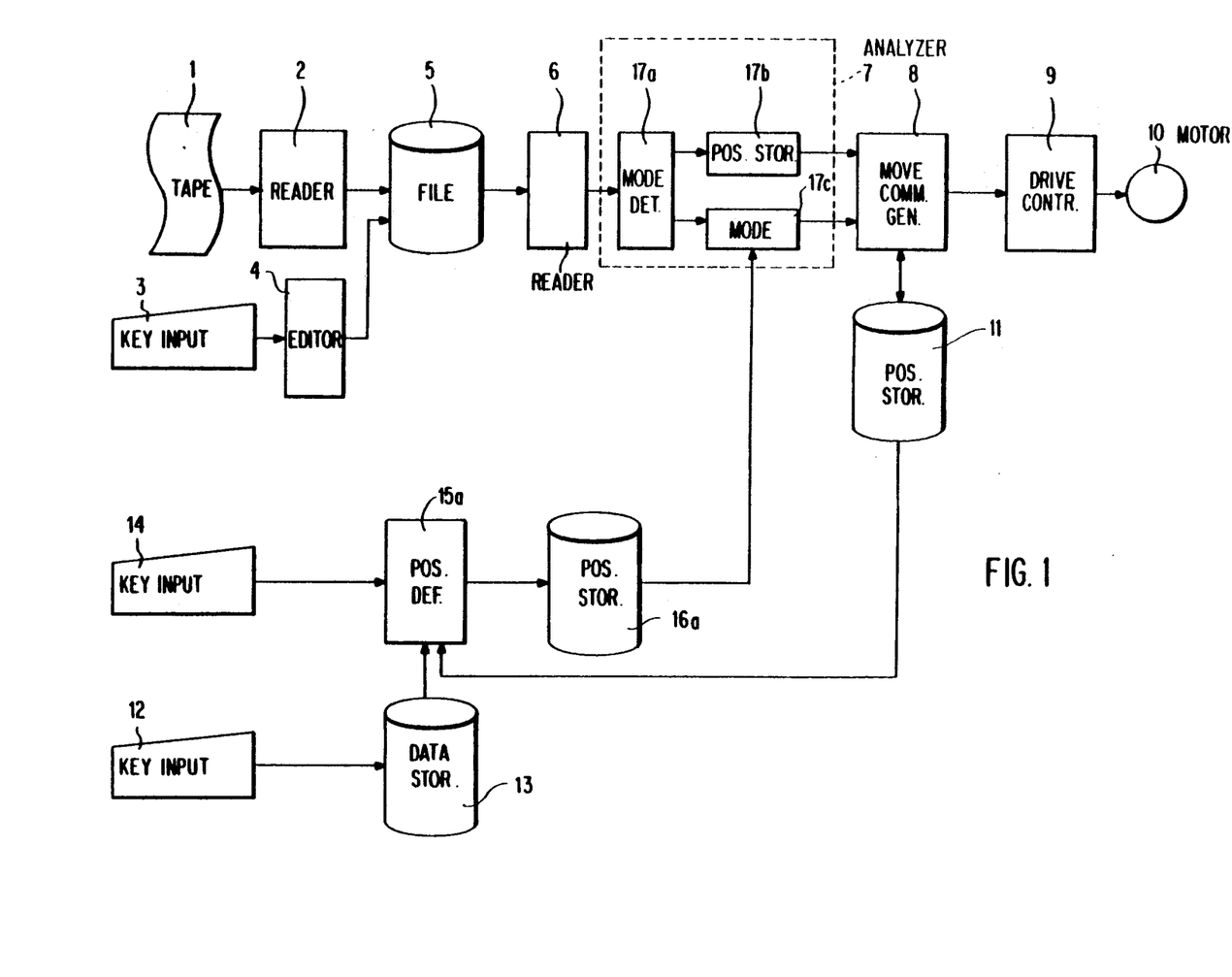
FIG. 1 is a block diagram of a first embodiment of the present invention.
Figure 2:
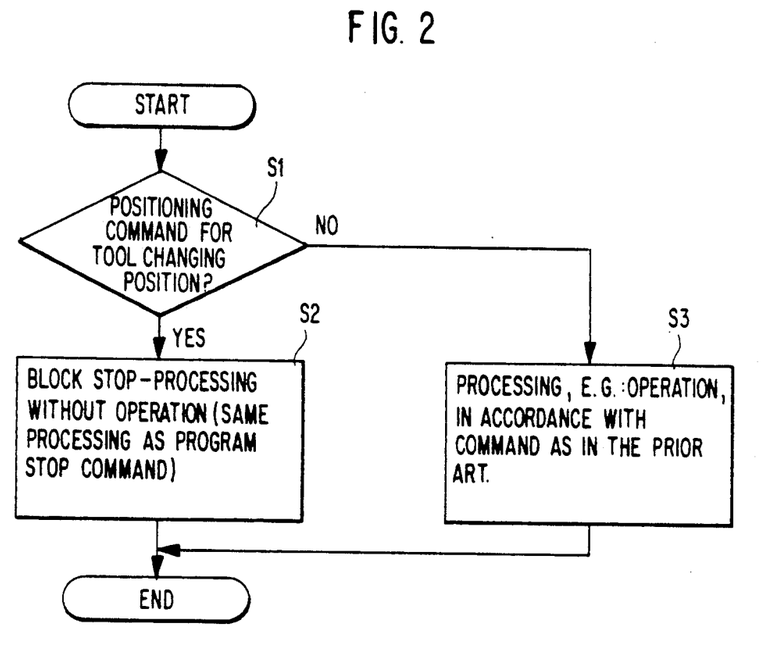
FIG. 2 is a flowchart illustrating the operation of a tool changing position storing mode processor according to the first embodiment of the invention.

A first embodiment of the present invention will now be described with reference to FIGS. 1 to 4. In FIG. 1, numerals identical to those in the block diagram of FIG. 8 identify identical parts, and therefore will not be further described. The numerical control unit includes an operation mode determining element 17a in the command analyzing device 7, a tool changing position storing mode processor 17b in the command analyzer 7, an ordinary operation mode processor 17c, an improved tool changing position defining device 15, and a memory 16a for storing multiple tool changing positions corresponding to the positioning commands for the tool changing positions.

Operation of this embodiment now will be described. Before machining is initialized, the lengths TL1 to TL4 of the tools 81 to 84 installed in the tool rest 85 are registered, via the key input device 12, into the tool data storing memory 13 in correspondence with the tool numbers.

Meanwhile, a machining program 1, including positioning commands (e.g., G24, G25, G26, G27) for, e.g., the tool changing positions, is written into the machining program file 5 from the machining program reader 2, or from the key input device 3 by the machining program editor 4.

Before starting the first machining operation, tool offset data, machining programs, etc., are written as described above, and a tool changing position storing mode is selected.

The tool changing position storing mode is selected from the key input device 3, or by a switch, etc. (not shown). When automatic operation is to be performed, one block of the machining program is read by the one-block reader 6 in either the tool changing position storing mode or the ordinary operation mode. Since the tool changing position storing mode has been selected for the first run, the mode determining element 17a of the command analyzer 7 determines the operation mode as the tool changing position storing mode, and causes the tool changing position storing mode processor 17b to be operated. As shown in the flowchart in FIG. 2, this processing determines whether the command provided is a positioning command for tool changing (step 1). When it is, the processor stops processing the block without any operation, like a program stop, using the M00 command, and assumes a state which allows processing of the block to be resumed at the next start (step 2). When the command is not such a positioning command, processing is performed corresponding to the command in the same manner as in the conventional system (step 3). The operation of the move command generator 8 and downstream elements is identical to that in the conventional system, and the servo motor 10 is driven according to the command.

When processing is stopped when the positioning command for the tool changing position is encountered in the tool changing position storing mode, the machine operator moves the tool rest 85 manually to the optimum tool changing position, using the jogging function or the like intrinsic to the unit, and teaches the numerical control unit the optimum tool changing position from the key input device 14.

The details of this operation will now will be described with reference to FIG. 4. Assuming that the workpiece 86, configured as indicated by the continuous line before machining, has so far been cut into a shape indicated by the broken line, the position of the tool rest 85 where the tool does not interfere with the workpiece 86, the machine chuck 87, etc., before machining is at position E. Since the workpiece 86 has been cut into the shape indicated by the broken line, the operator moves the tool rest 85 manually to position D as the non-interfering optimum tool changing position and teaches the numerical control unit the optimum tool changing position from the keyboard This allows position D of the tool rest 85 to be registered as the tool changing position after the progress of machining, in addition to position E which could only be used before machining.

When the optimum tool changing position signal is provided from the keyboard, the tool changing position defining device 15a extracts the current position from the current position memory 11 and stores it in the multiple-tool changing position memory 16a. This operation is repeated until no positioning commands for tool changing positions remain in the machining program, and the tool changing position data is stored into the multiple-tool changing position memory 16a in order of storage.

To continue the same machining as described above, the operation mode is set to the ordinary operation mode. At this time, the mode determining circuit 17a determines the operation mode as the ordinary operation mode and causes the ordinary operation mode processor 17c of the command analyzer 7 to be operated. As shown in the flowchart in FIG. 3, this processing determines whether the command given is a positioning command for the tool changing position (step 11). When it is, the next tool changing position, stored as described previously, is read from the multiple-tool changing position memory 16a (step 12). Positioning command data which defines the corresponding position as an end point is output (step 13). The reference pointer then is incremented by one to read the next tool changing position when the positioning command for the next tool changing position is provided (step 14).

Figure 3:
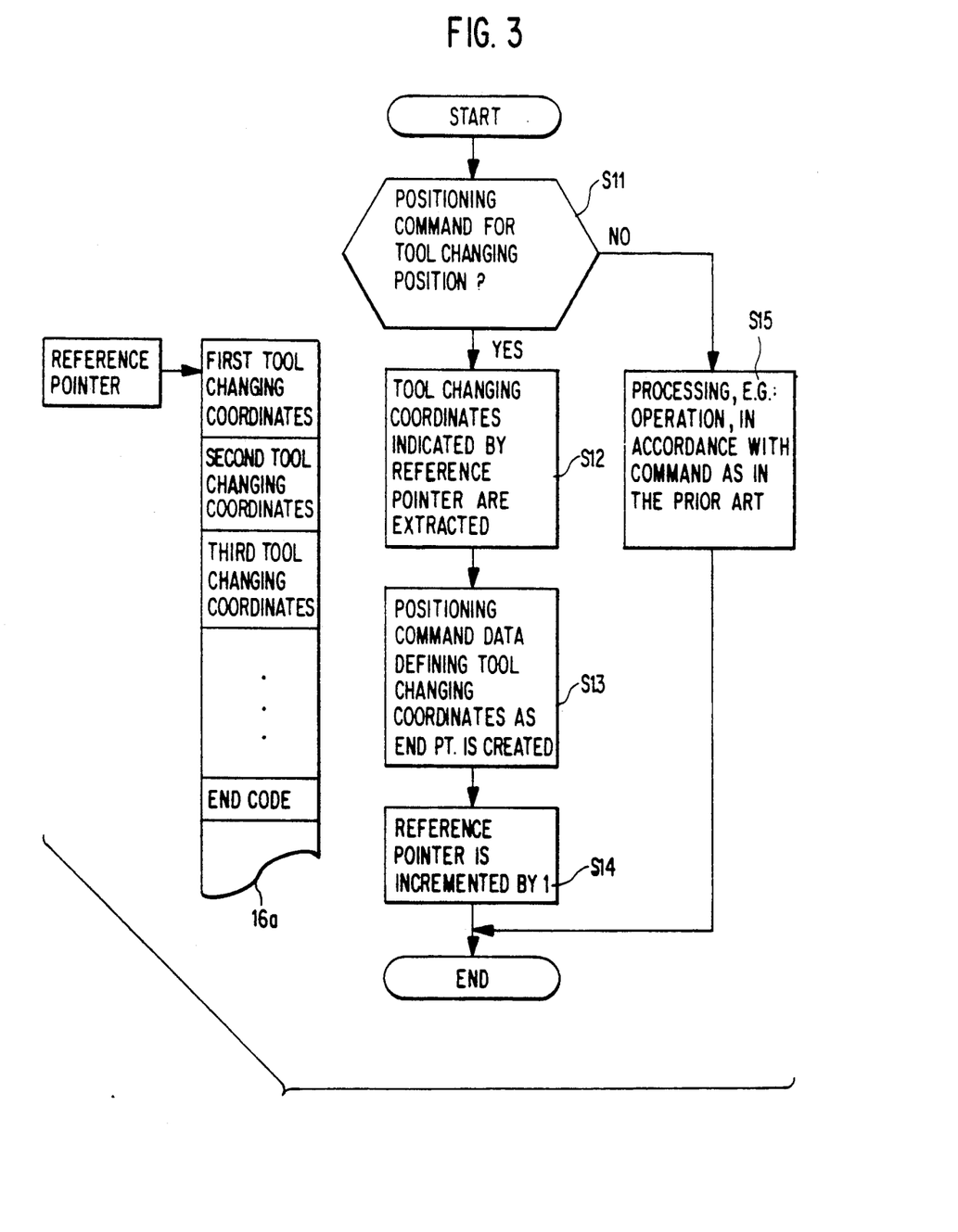
FIG. 3 is a flowchart showing the operation of an ordinary operation mode processor according to the first embodiment of the invention.

Upon reaching the position of an end code (generally 0), the reference pointer returns to the first position. When the command provided is not a positioning command, operations, etc., corresponding to the command are performed in the same manner as in the conventional system (step 15).

In this first embodiment of the invention, a block stop, effected without any operation on the positioning command for the tool changing position in the tool changing position storing mode, may be made after positioning has been effected for a specific or a preceding tool changing position. In this case, the machine comes to a stop without putting the tool into contact with the workpiece so that cutter marks are not made on the workpiece.

When there is only one multiple-tool changing position memory 16a as in this embodiment, the same multiple-tool changing position memory 16a must be used for both first machining and second (or subsequent) machining operations which have different tool changing positions. Hence, the optimum tool changing positions for the first machining operation stored in the memory 16a as described above will be cleared by the tool changing positions for the second machining operation.

In this case, the tool changing positions must be redefined for the first machining operation if the first machining operation is performed again after the second machining operation. This manner of operation causes difficulty and inconvenience This problem can be solved by providing a multiple-tool changing position memory 16a for each machining program and managing the memories 16a and programs in correspondence with each other. However, this increases the necessary memory capacity, and it is very troublesome to manage the memories 16a and the machining programs in correspondence with each other.

Figure 6:
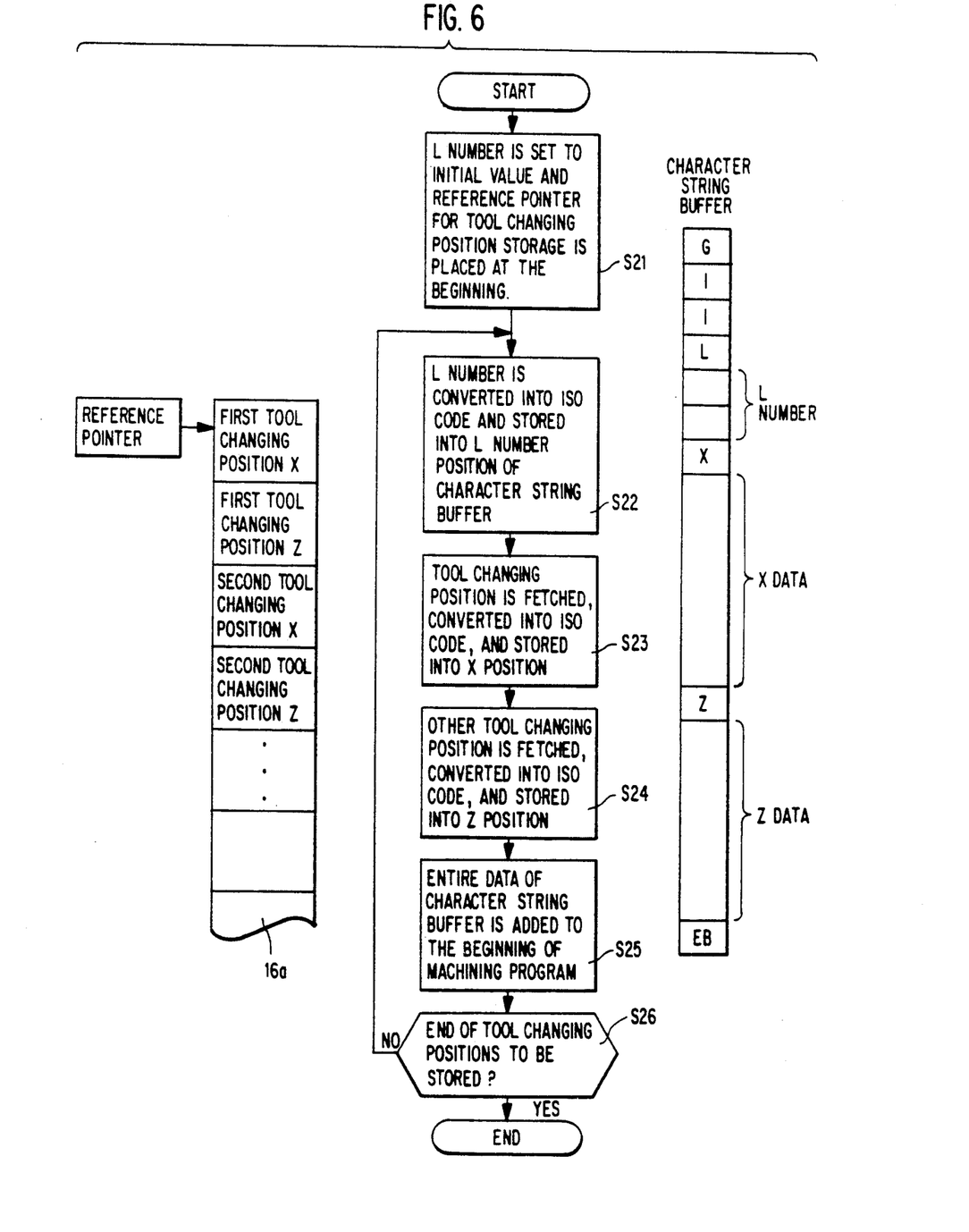
FIG. 6 is a flowchart illustrating the operation of a tool changing position editor according to the second and third embodiments of the invention.
Figure 7:
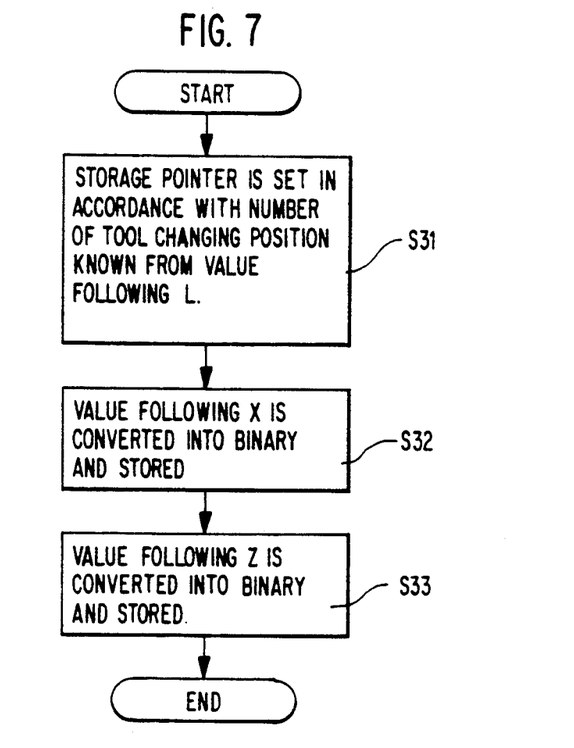
FIG. 7 is a flowchart showing the operation of a tool changing position storing processor according to the second and third embodiments of the invention.

These disadvantages can be overcome according to further embodiments of the invention by defining the tool changing position not from the key input device 14, but from the machining program. The second and third embodiments illustrated in FIGS. 5 to 7 are designed to achieve this end.

Figure 5:
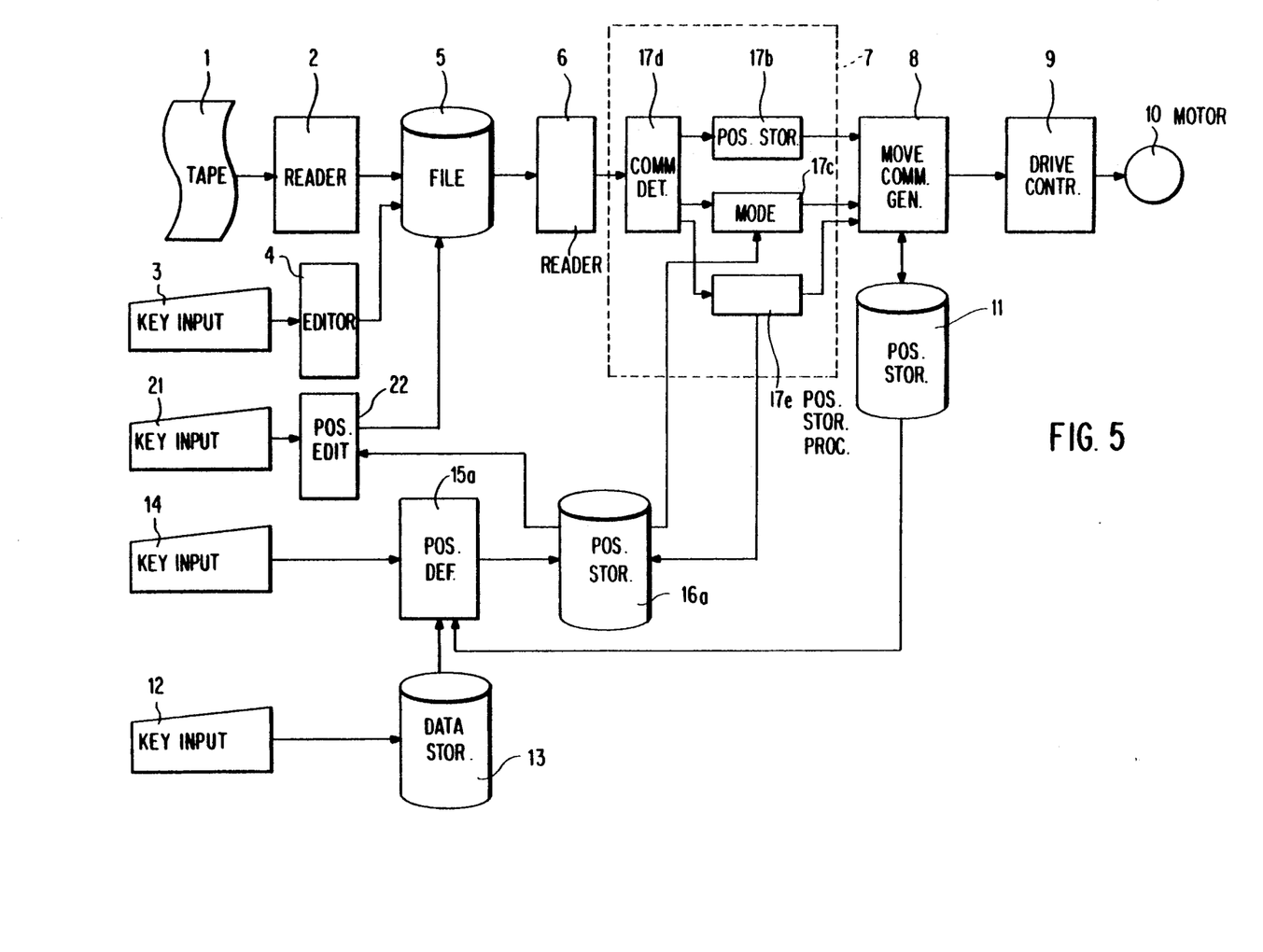
FIG. 5 is a block diagram of the second and third embodiments of the invention.

Referring to FIG. 5, a key input device 21 controls commands for editing the tool changing position of the multiple-tool changing position memory 16a in the machining program as a tool changing position setting command. Editor 22 generates the tool changing position according to the command given from the keyboard. A command determining area 17d of the command analyzer 7 differentiates between the tool changing position setting command and said other commands, and a processor 17e of the command analyzer 7 stores the tool changing position according to the tool changing position setting command. The other parts are identical to those of the first embodiment, and will not be described.

The operation of the second embodiment now will be described. When a second machining operation, having different tool changing positions from the first machining operation, is to be performed after the first machining operation, a command to start editing the tool changing position setting commands is output from the key input device 21. The machining program for the first machining operation is at this time stored in the machining program file 5. The aforementioned command causes the tool changing position editor 22 to be operated. As shown in a flowchart in FIG. 6, this processing extracts the coordinates of a tool changing position from the multiple-tool changing position memory 16a, converts it into the form of a machining program block in ISO code (or EIA code) in accordance with the setting command format, and adds it to the beginning of the machining program. The processing is complete when all coordinates registered in the multiple-tool changing position memory 16a have been converted.

In this embodiment, "G11" is specified as a tool changing position setting command code, the number of the tool changing position is specified by a value following L, and the coordinate values of the X and Z axes for the tool change point are specified by values following X and Z, respectively.

Specifically, as shown in FIG. 6, the L number is set to an initial value and the reference pointer of the multiple-tool changing position memory 16a is set at the beginning (step 21). The L number is then converted into ISO code (or EIA code) and stored into the L number position of the character string "G11L X Z . . . EB" (step 22). One tool changing coordinate then is fetched, converted into ISO (or EIA) code, and stored in the X position of the character string (step 23). The other tool changing coordinate then is fetched, converted into ISO (or EIA) code, and stored in the Z position of the character string (step 24). The entire data of the character string, which resides in a buffer, thus having stored the L number and the X and Z Coordinate values, is added to the beginning of the machining program (step 25).

The operation of steps 22 to 25 is repeated until the end code is read from the multiple-tool changing position memory 16a (step 26), and the addition of the tool changing positions to the machining program is made in order of reading the tool changing positions. When the end code is read from the tool changing position memory 16a (step 26), the transfer of the tool changing positions from the multiple-tool changing position memory 16a to the machining program is completed.

During a run, the one-block reader 6 reads the machining program on a block-by-block basis from the machining program file 5, and when the "G11" command is recognized by the command determining area 17d, the tool changing position storing processor 17e is operated. As shown in the flowchart in FIG. 7, this processing is performed in the reverse manner from the operation performed by the tool changing position editor 22. That is, when the "G11" command stored at the beginning of the machining program is recognized, the storage pointer of the multiple-tool changing position memory 16a is set in accordance with the number of the tool changing position known from the value following L (step 31). The value following X then is converted into binary form and is stored in the corresponding pointer-indicated place in the multiple-tool changing position memory 16a (step 32). The value following Z then is converted into binary form and is stored in the corresponding pointer-indicated place in the multiple-tool changing position memory 16a (step 33). The operation of steps 31 to 33 is repeated until there are no "G11" commands stored at the beginning of the machining program. The tool changing position storing processor 17e operates as described above.

When the command provided is not a tool changing position setting command, the ordinary operation mode processor 17c of the command analyzer 7 is operated. After the tool changing positions thus have been stored from the machining program in the multiple-tool changing position memory 16a, providing the position command for the tool changing position causes the tool changing positions to be read from the multiple-tool changing position memory 16a in order and the positioning command data defining the corresponding position as an end point to be output, as in the first embodiment.

The second embodiment of the invention, further improving the first embodiment, may be applicable not only to the first embodiment but also to conventional systems or the like described with reference to FIGS. 8 and 9, so long as a first machining operation is to be performed a second time after a second machining operation which has different tool changing positions. In this manner, the tool changing positions of the first machining operation need not be redefined each time.

The second embodiment of the invention as described above re-stores the tool changing positions from the machining program into the multiple-tool changing position memory 16a during the next run of the program. However, this embodiment may have its command format changed to allow the tool changing positions to be commanded directly from the machining program, without re-storing them into the multiple-tool changing position memory 16a being necessary.

While the third embodiment has been described as an adjunct executed after the second embodiment (i.e., after tool changing positions stored in the memory have been encoded and stored in the machining program), such need not be the case. The third embodiment allows one to write beforehand a machining program including encoded tool changing positions, thus allowing the required tool changing positions to be specified directly from the machining program without use of the second embodiment.

It will be apparent that the invention, as described above, achieves a numerical control unit which during a teaching mode stops operation every time a positioning command for the tool changing position is given, so that the operator can teach the optimum tool changing position, allowing the positioning distance to be reduced by a simple operation and the machining time to be minimized.

The invention further allows the contents of the tool changing position memory to be added to the machining program as tool changing position setting commands. Also, the tool changing positions may be set in the tool changing position memory from the machining program, so that tool changing positions corresponding to various machining programs can be used repeatedly without being redefined, thereby reducing the length of time required to prepare for machining.

While the invention has been described in detail above with reference to preferred embodiments, various modifications within the scope and spirit of the invention will be apparent to people of working skill in this technological field. Thus, the invention should be considered as limited only by the scope of the appended claims.

What is claimed is:

1. A numerical control unit comprising:
   means for storing a plurality of tool change positions;
   means for executing a machining program;
   means for stopping execution of said machining program in a teaching mode upon encountering one of a tool change instruction or a positioning command for said tool change instruction; and
   means for supplying a tool change position after execution is stopped, and for storing said tool change position in said storing means.

2. A numerical control unit as claimed in claim 1, further including means for indicating ones of said tool change positions sequentially in an operational mode, and means for reading an indicated tool change position when encountering one of said tool change instruction or said position command for said tool change instruction, and incrementing said indicating means accordingly.

3. A numerical control unit as claimed in claim 2, further including tool changing position editing means for adding said tool changing positions stored in said storing means to said machining program.

4. A numerical control unit as claimed in one of claims 2 or 3, further including tool changing position storing processing means for storing said tool changing positions from said machining program into predetermined addresses of said storing means when a tool changing position setting command is given by said machining program.

5. A numerical control unit comprising:
   means for determining a plurality of tool change positions required for performing a predetermined machining operation prior to performing said predetermined machining operation;
   means for storing said plurality of tool change positions;
   means for indicating each of said plurality of tool change positions in sequence during said machining operation; and
   means for reading an indicated tool change position in response to one of a tool change instruction and a position command for said tool change instruction, and incrementing said indicating means accordingly.

6. A numerical control unit for running a machining program, said unit comprising:
   means for determining a plurality of tool change positions required for performing a predetermined machining operation prior to performing said predetermined machining operation;
   means for storing said plurality of tool changing positions;

means, responsive to tool change instructions, for retrieving respective ones of said tool changing positions; and tool changing position editing means for adding said tool changing positions stored in said storing means to said machining program.

7. A numerical control unit for running a machining program, said unit comprising:

means for determining a plurality of tool change positions required for performing a predetermined machining operation prior to performing said predetermined machining operation;

means for storing said plurality of tool changing positions;

means, responsive to tool change instructions, for retrieving respective ones of said tool changing positions;

tool changing position editing means for adding said tool changing positions stored in said storing means to said machining program; and tool changing position storing processing means for storing said tool changing positions from said machining program into predetermined addresses of said storing means when a tool changing position setting command is given by said machining program.

* * * * *